United States Patent [19]

Parnell

[11] 4,080,187
[45] Mar. 21, 1978

[54] FORMATION OF FOAMED SILICATE ARTICLES
[75] Inventor: Donald R. Parnell, Big Flats, N.Y.
[73] Assignee: Corning Glass Works, Corning, N.Y.
[21] Appl. No.: 640,736
[22] Filed: Dec. 15, 1975
[51] Int. Cl.$^2$ .................. C03B 19/08; C03C 15/00
[52] U.S. Cl. .................. 65/22; 65/30 R; 65/32; 106/40 V
[58] Field of Search .............. 106/75, 40 R, 74, 40 V; 65/23, 30 R, 22, DIG. 13, 32

[56] References Cited
U.S. PATENT DOCUMENTS

| | | | |
|---|---|---|---|
| 3,261,894 | 7/1966 | Seidi | 106/40 R |
| 3,743,601 | 7/1973 | Rao | 106/75 X |
| 3,756,839 | 9/1973 | Rao | 106/75 |
| 3,867,156 | 2/1975 | Fukumuto et al. | 106/40 R |
| 3,870,496 | 3/1975 | Cutler | 65/22 |
| 3,877,954 | 4/1975 | Wustefeld | 106/75 |
| 3,915,720 | 10/1975 | Tarcza | 65/30 R |
| 3,929,439 | 12/1975 | Pierce | 65/DIG. 14 |
| 3,948,629 | 4/1976 | Bartholomew | 106/74 |

Primary Examiner—S. Leon Bashore
Assistant Examiner—Frank W. Miga
Attorney, Agent, or Firm—Clinton S. Janes, Jr.; Clarence R. Patty, Jr.

[57] ABSTRACT

The instant invention is directed to the production of foamed alkali metal silicate articles of low density, good chemical durability, and low thermal conductivity which can readily be made in essentially unlimited sizes and configurations. The process of the invention contemplates four general steps. First, an anhydrous glass consisting essentially of narrowly-defined compositions within the $Na_2O$ and/or $K_2O$-$Al_2O_3$ and/or $B_2O_3$ and/or $ZnO$ and/or $Fe_2O_3$-$SiO_2$ field is hydrated. Second, particles of said hydrated glass not exceeding about 5 mm. in diameter are dehydrated in such a manner as to cause the formation of individual foamed bodies. Third, the individual foamed particles are collected together and rehydrated to a sufficient extent to bond said particles into an integral mass, but not so much to cause the foamed particles to collapse. Fourth, the integral mass is dehydrated to cause foaming thereof.

10 Claims, No Drawings

FORMATION OF FOAMED SILICATE ARTICLES

BACKGROUND OF THE INVENTION

The production of alkali metal-containing silicate glass foams has been disclosed in the prior art. One description of such can be found in U.S. Pat. No. 3,498,802. That patent discloses the hydration of alkali metal silicate glass powders in steam atmospheres. The primary teaching of the patent is that water migrates into the glass structure to thereby impart thermoplastic properties thereto and to produce products demonstrating the characteristics of hydraulic cements. The utility of the invention encompassed a wide range of glass compositions, viz, about 6–20 mole percent $Na_2O$ and/or $K_2O$ and 80–94 mole percent $SiO_2$, the sum of those components constituting at least 90% of the total composition. Such compatible metal oxides as $Al_2O_3$, $B_2O_3$, BaO, MgO, PbO, and ZnO were stated to be satisfactory optional ingredients, whereas CaO and $Li_2O$ were preferably entirely absent from the compositions.

The process of the invention involved subjecting glass powders to a gaseous atmosphere containing at least 50% by weight steam at a pressure of at least 1 atmosphere and a temperature customarily and preferably between about 100°–200° C. The hydration treatment was conducted for a sufficient length of time to produce at least a surface layer on the glass powders having a water content of up to about 30% by weight.

Whereas the main emphasis of the patent is concerned with the thermoplastic behavior that the hydrated glass can display because of the water incorporated into the structure thereof, the formation of foamed masses is also disclosed via heating the hydrated material at temperatures between about 80°–150° C. Such heating dehydrates the glass with concomitant foaming as the water escapes out of the glass structure.

However, certain composition regions within the description of that patent demonstrated such poor chemical durability and weathering resistance that, unless the surfaces thereof were protected from the ambient environment, articles made therefrom quickly lost their integrity. U.S. Pat. No. 3,811,853 discloses the manufacture of articles which can profitably utilize this character of poor durability and resistance to weathering. That patent describes the hydrating of glass articles, particularly containers, consisting essentially, by weight, of about 10–30% $Na_2O$ and/or $K_2O$ and 65–90% $SiO_2$, the sum of those components constituting at least 80% of the total composition. Thereafter, means are provided for securing a weathering-resistant surface on the articles. A self-degradation reaction begins immediately and spontaneously when the weathering-resistant surface is penetrated or removed, since that act exposes the poorly-durable, hydrated interior portion of the article to the ambient atmosphere.

U.S. Pat. No. 3,912,481 provides a method for producing hydrated alkali metal-containing silicate glass articles that can demonstrate good thermoplastic properties, and which also will manifest relatively good chemical durability and resistance to weathering. The disclosed method contemplates a two-step procedure wherein first a glass article consisting essentially, in mole percent, of about 3–25% $Na_2O$ and/or $K_2O$ and 50–95% $SiO_2$, the sum of those ingredients comprising at least 55% of the total composition, is hydrated in a saturated or nearly saturated steam environment at elevated temperatures and pressures. Subsequently, the article is partially dehydrated in an atmosphere of lower relative humidity at elevated temperatures. The principal thrust of the invention is to control the amount of water removed from the glass during the dehydration process such that adequate water will remain within the glass structure to impart thermoplastic properties thereto, but sufficient water will have been eliminated to result in a product having substantially improved chemical durability and weathering resistance, when compared with that exhibited by the fully hydrated glass. The patent emphasizes that care must be exercised during the dehydration step to avoid foaming of the glass. The compatible metal oxides $Al_2O_3$, $B_2O_3$, BaO, MgO, PbO, and ZnO are noted as being operable additives to the base alkali metal silicate glass.

The utility of water as a foaming agent to produce foamed masses of alkali metal silicate glasses is well-known to the prior art. Several recent U.S. patents utilizing that phenomenon include U.S. Pat. Nos. 3,663,249, 3,725,095, 3,743,601, and 3,756,839. Nevertheless, such foamed articles, when present as a simple glass composition, have not demonstrated adequate stability to be of practical service. Hence, numerous inventions have been proposed involving the addition of various additives to improve the durability, i.e., to "insolubilize" the foams.

U.S. application Ser. No. 641,025, filed concurrently herewith in the names of P. E. Blaszyk, W. T. Brydges, III, E. J. Illig, W. H. Tarcza, and C. K. Wu, now abandoned describes the manufacture of foamed glass articles manifesting good mechanical strength, a high degree of closed porosity, low friability, and good chemical durability. In general, the method comprises hydrating particles of glass having compositions within a very narrow range of the $Na_2O$-$K_2O$-$Al_2O_3$-$ZnO$-$SiO_2$ system at elevated temperatures and pressures in saturated or nearly saturated steam environments to such an extent that the individual particles coalesce together into an integral mass. Thereafter, the integral mass is dehydrated in a manner designed to cause foaming of the glass as the water escapes from the structure thereof. The resultant foamed articles display such good chemical durability and weathering resistance that additives to "insolubilize" the articles are not required.

OBJECTIVE OF PRESENT INVENTION

The principal objective of the instant invention is to provide a method for producing shaped foamed glass articles of homogeneous density with relatively uniform cell dimensions having mechanical properties and chemical durability similar to those illustrated by the articles of Ser. No. 641,025, now abandoned supra, but wherein the operable base glass composition field can be considerably broadened from that demanded in Ser. No. 641,025 now abandoned. The use of differing compositions permits products of widely-varying densities and thermal conductivities to be developed.

SUMMARY OF THE INVENTION

I have discovered that this objective can be accomplished in glass foams produced from compositions consisting essentially, in mole percent on the anhydrous basis, of about 8–23% $Na_2O$ and/or $K_2O$, 1.5–11.5% $Al_2O_3$ and/or $B_2O_3$ and/or $Fe_2O_3$ and/or ZnO, and 65–90% $SiO_2$. Foamed glass articles made from such compositions will exhibit densities of 0.5 g/cc and less. Additions up to about 1 mole % of metal oxides known to have utility in reducing the surface tension of glass melts, such as $CdO$, $MoO_3$, $TiO_2$, and $WO_3$, can be operable in decreasing the density of the foamed article. The method contemplates four general steps. First, particles, granules, beads, or other fine-dimensioned anhydrous glass shapes are subjected to a saturated or near-saturated steam atmosphere at elevated temperatures and pressures for a sufficient length of time to cause the penetration of water therein to an amount at least in excess of 10% by weight. Commonly, the hydration step will be continued until the glass is essentially saturated with water. If desired, the hydration parameters will be controlled such that the individual glass shapes do not coalesce into an integral mass. Normally, however, the hydration will be permitted to coalesce the glass bodies into an integral mass which will subsequently be pulverized. Second, the hydrated shapes are dehydrated in such a manner that individual foamed bodies are formed. Third, the foamed bodies are placed together and subjected to a hydration treatment similar to that of the first step above, but wherein the treatment is carried out only for so long as to cause the foamed bodies to bond together into an integral mass and not to cause the foamed bodies to collapse. Fourth, the integral mass is exposed to a dehydration treatment similar to that of the second step above to produce a relatively homogeneously porous article.

DESCRIPTION OF PREFERRED EMBODIMENTS

The following table records a group of glass compositions, expressed in mole percent on the oxide basis, suitable for use in the instant invention. $CdO$, $MoO_3$, $TiO_2$, and $WO_3$ have been included as surface tension reducing agents. The actual batch ingredients can comprise any materials, either the oxides or other compounds, which, when melted together, will be converted into the desired oxide composition in the proportions. The batch ingredients can be ballmilled together to assist in achieving a homogeneous melt and then melted in platinum crucibles for about 16 hours at 1300°–1650° C. [It will be appreciated that larger melts can be conducted in pots or continuous melting tanks in accordance with conventional glass melting practice.] Glass bodies of small thickness measurements were desired so a stream of the molten glass was run directly from the crucible into a container of water. This practice has been termed "drigaging." Alternative methods for forming fine-dimensioned glass bodies could utilize such practices as passing a stream of molten glass through a hot flame or through an air blast. Also, thin ribbon and fibers could be drawn from a glass melt, the ribbon being subsequently broken in flakes and the fibers used as such, if desired. Finally, glass articles of substantial bulk could be formed which would then be crushed and comminuted into finely divided particles. This last alternative is not deemed very desirable from a practical point of view, because of the considerable expense and time involved in pulverizing large glass articles into small particles. Experience has indicated that thickness dimensions of less than about 5 mm. are generally to be preferred for the subsequent hydration step.

TABLE I

|  | 1 | 2 | 3 | 4 | 5 | 6 | 7 | 8 | 9 | 10 |
|---|---|---|---|---|---|---|---|---|---|---|
| $SiO_2$ | 73.2 | 72.2 | 67.1 | 65.9 | 75.6 | 74.9 | 89.7 | 84.5 | 81.7 | 83.3 |
| $Na_2O$ | 18.8 | 18.6 | 22.3 | 21.9 | 19.5 | 19.4 | 8.8 | 13.2 | 15.7 | 11.7 |
| $ZnO$ | 8.0 | — | 10.6 | — | 4.9 | — | 1.5 | 2.2 | 2.6 | 5.0 |
| $B_2O_3$ | — | 9.2 | — | 12.2 | — | 5.7 | — | — | — | — |

|  | 11 | 12 | 13 | 14 | 15 | 16 | 17 | 18 | 19 |
|---|---|---|---|---|---|---|---|---|---|
| $SiO_2$ | 72.5 | 74.9 | 81.9 | 80.5 | 74.3 | 73.4 | 70.6 | 70.2 | 69.9 |
| $Na_2O$ | 18.7 | 19.4 | 13.0 | 14.2 | 17.4 | 17.3 | 18.2 | 18.1 | 18.0 |
| $ZnO$ | 8.8 | 5.7 | 3.1 | 2.3 | 6.3 | 6.2 | 11.2 | 11.2 | 11.1 |
| $Al_2O_3$ | — | — | 1.2 | 1.8 | — | 3.1 | — | — | — |
| $Fe_2O_3$ | — | — | 0.8 | 1.2 | 2.0 | — | — | — | — |
| $CdO$ | — | — | — | — | — | — | — | 0.5 | 1.0 |

|  | 20 | 21 | 22 | 23 | 24 |
|---|---|---|---|---|---|
| $SiO_2$ | 70.5 | 70.8 | 71.0 | 70.9 | 78.2 |
| $Na_2O$ | 18.2 | 18.3 | 18.3 | 18.0 | — |
| $ZnO$ | 10.4 | 10.4 | 10.4 | 11.0 | 8.6 |
| $B_2O_3$ | 0.9 | — | — | — | — |
| $MoO_3$ | — | 0.4 | — | — | — |
| $WO_3$ | — | — | 0.3 | — | — |
| $TiO_2$ | — | — | — | 0.1 | — |
| $K_2O$ | — | — | — | — | 13.2 |

The glass particles will be removed from the water, dried, screened so as to pass a No. 20 U.S. Standard Sieve but rest upon a No. 40 U.S. Standard Sieve (−841 microns + 420 microns), and placed upon a TEFLON® pad. TEFLON® was employed because of its inertness to the glass. It will be recognized that other materials which would not adhere to or react with the glass particles would be equally useful. The pad with the glass particles will be transferred to an autoclave and supported horizontally above the floor thereof. An autoclave was employed in which to conduct the hydration step inasmuch as careful control of steam pressure, temperature, and relative humidity can be readily exercised in such an apparatus. The autoclave employed was a commercially marketed type having a capacity of about 1 ft³. The apparatus will be sealed with a source of water inside and then heated to generate steam in situ at a desired pressure. Steady state operation of the autoclave will normally be attained, except at very high temperatures, within about one hour.

The period of time required to cause hydration of the glass completely therethrough is a function of the pressure, temperature, and relative humidity employed in the hydration process and, to a lesser extent, the specific glass composition. The time for hydration is also, self-evidently, inversely related to the thickness dimension of the anhydrous glass body being exposed. Hence, higher treatment temperatures, steam pressures, and relative humidities will customarily result in more rapid hydration. In general, the hydration follows the law of diffusion, i.e., at constant temperature, relative humidity, and pressure, the depth of water penetration increases linearly with the square root of treating time.

Thus, a glass body of thicker dimensions will demand a longer exposure to hydrating conditions than will a thinner body.

It was explained in U.S. Pat. No. 3,912,481, supra, the expression "relative humidity" is not a precisely accurate description of a $H_2O$-containing atmosphere where extremely high temperatures are encountered because, by its very words, "relative humidity" contemplates a level of saturated vapor pressure. However, there is a critical temperature, i.e., a maximum temperature at which any gas can be liquefied, with a concomitant critical pressure, i.e., the pressure required to liquefy a gas at its critical temperature. In the case of $H_2O$, the critical temperature is about 374° C. and the critical pressure about 3200 psi. Above the critical temperature, $H_2O$ has been described as a fluid which is not deemed to be either a liquid or a gas.

This phenomenon is discussed in U.S. Pat. No. 3,912,481 and reference is made to pages 180 and 181 of "Hydrothermal Crystal Growth," R. A. Laudise and J. W. Nielsen, *Solid State Physics*, 12, pp. 149–222, Academic Press, New York, 1961. It is pointed out therein that the person of ordinary skill in the art, when provided with the standard steam tables and being knowledgable about the concept of "filling factor," i.e., the percentage of the volume of an autoclave or other pressure vessel which is filled with liquid $H_2O$ at ambient temperature, could readily determine the necessary filling factor to secure a desired saturated or less than saturated steam atmosphere at temperatures below 374° C. and, at temperatures above 374° C., could choose a filling factor to achieve any desired pressure at a specified temperature. Hence, at above the critical temperature, the person of ordinary skill in the art can validly extrapolate the behavior of the environment thereat from that of an environment of a designated relative humidity below the critical temperature.

Therefore, the term "relative humidity" is utilized by the present applicant in the same sense as that employed in U.S. Pat. No. 3,912,481 and reference is hereby expressly made to that patent and the Laudise and Nielsen literature article, supra, for further discussion.

In carrying out the following description of hydration, the steam pressure developed through heating distilled water placed in the bottom of the autoclave was controlled by regulating the temperature employed. The relative humidity secured within the autoclave was achieved by predetermining the amount of water necessary therefor at the particular temperature to be utilized and, to insure good reproducibility of results, the pressure vessel ought to be dried thoroughly prior to each use. Because the quantities of glass to be treated were relatively small, the water absorbed therewithin during the hydration step will not be of such an amount as to cause any significant reduction in pressure. Filling factors of about 10% or less will normally be sufficient except, perhaps, at very high temperatures.

Glass particles or other shapes having thickness dimensions less than about 5 mm. are preferred since total hydration therethrough can be accomplished within a not unreasonably long length of time. It will be appreciated, of course, that the hydration of very fine particles can be achieved in relatively short times. Hence, depending upon temperature and relative humidity, exposure times as brief as 0.25 hour may be sufficient for finely divided material; whereas up to 72 hours and longer may be demanded for coarsely divided particles.

The hydration treatment will normally be conducted for only so long as to secure total hydration therethrough. Continued hydration does not appear to have any deleterious effect upon the product, but neither does it appear to confer any benefit thereupon. The glass particles may flow together during the hydration step to form an integral body.

In general, the temperature employed in hydration will exceed the softening point of the fully hydrated glass. Hence, although exposures at 100° C. can be operable, temperatures in excess of about 200° C. will commonly be utilized to secure a practical rate of hydration. Furthermore, because hydration will proceed at a more rapid rate where the atmosphere is saturated with water or the relative humidity within the autoclave is 100%, a saturated or near-saturated (a relative humidity of at least 75%) atmosphere will conventionally be utilized. Likewise, for practical reasons the maximum hydration temperature employed will be held below the softening point of the anhydrous glass. Accordingly, although autoclaves are available capable of operating at temperatures of 500°–600° C., laboratory experience has indicated little significant advantage in hydration rate at temperatures in excess of about 374° C., i.e., the critical temperature. Moreover, the costs of operating at such temperatures and pressures are considerably higher so, therefore, practicality has dictated that the hydration be carried out at temperatures below the critical temperature.

The hydrated glass mass will then be pulverized into particles which will at least pass through a No. 10 U.S. Standard Sieve (2 mm.) and, preferably, through a No. 40 U.S. Standard Sieve (420 microns). [It will be appreciated that the individual anhydrous glass particles could be physically separated from each other during the hydration step, thereby obviating their coalescence together. However, such practice is quite tedious and crushing the glass in the hydrated state is not difficult. Therefore, hydration of the particles into an integral mass is the preferred practice.] The hydrated glass particles will then be dehydrated by being placed into a container, e.g., a glass crystallization dish, an aluminum foil cup, or a TEFLON® tray having a slip-fitting cover riding freely on the hydrated glass particles, and the container transferred to a furnace or kiln or an autoclave operating at a temperature above 100° C. The use of such a cover does not appreciably inhibit dehydration or the expansion of the hydrated glass particles as the water is eliminated therefrom, but acts to retain the particles within the container during dehydration and appears to promote the development of more uniformly sized pores, which results in a more homogeneous density in the final product. A permeable cover might operate with similar efficacy. Customarily, elevated temperatures, i.e., above about 200° C., but below the softening point of the anhydrous glass, will be employed. Thus, sintering together of the foamed particles is to be avoided. Also, the preferred practice utilizes an atmosphere wherein the relative humidity is less than 50% of that employed in the hydration step, although satisfactory results can be achieved where the relative humidity is as much as 75% of that utilized in the hydration step. A temperature of 400° C. was found to be particularly effective, the dehydration with consequent foaming of the particles resulting therefrom with low relative humidity, created a phenomenon akin to that observed in popping popcorn. In general, the glass is foamed with the substantially instantaneous release of water. The dehydration process will be continued for a sufficient length of time to cause the amount of released water to constitute at least 50% of that present in the saturated particles and this amount can be in excess of 75% of that initially present. This time of dehydration will, self-evidently, vary with the temperature employed. Thus, at high temperatures, 1-2 minutes may suffice, whereas at lower temperatures, 2-4 hours may be required for complete dehydration. Longer exposures at temperatures do not appear to deleteriously affect the particles, but are not practically desirable.

Thereafter, the container holding the foamed particles will preferably be placed in an autoclave operating at a temperature in the vicinity of or below the annealing point of the fully hydrated glass, i.e., at temperatures below about 250° C. with the glasses of the instant invention, with a saturated or near-saturated atmosphere (a relative humidity of at least 50%). Ideally, the steam-containing atmosphere will contact all portions of the foamed particles at the same time. Thus, the preferred container for the foamed particles will have perforate walls to permit entry of steam to the particles. Hydration at too high a temperature, i.e., at too high a water vapor pressure, will lead to a total collapse of the foamed particles and, in so doing, destroy the body from which the foamed article was to have been made. Hydration at too low a temperature will result in only lightly bonding the individual foamed particles into a integral mass, such that the subsequent dehydration step disperses the mass back into individual foam particles. Therefore, the hydration must be carried out under conditions that the individual foamed particles will be tightly bonded into a uniform body, but the bubbles will not collapse. Such operable temperatures will generally range between about 100°-250° C. Here, again, the hydrated glass must have a water content in excess of 10% by weight and will desirably be saturated. Since more careful control can be exercised at the lower hydration temperatures (although, of course, longer treatment times are required), a schedule of 130° C. at 100% relative humidity for 16 hours has been found particularly suitable. Practical treatment times will generally range between about 0.25-24 hours.

Finally, the container with the rehydrated foamed mass will be heated in a chamber, e.g., a kiln, a furnace, or the above-described autoclave, in a similar manner to that described above for the initial dehydration-foaming step. Hence, temperatures above 100° C. and, preferably, above 200° C., but below the softening point of the anhydrous glass, will be employed. Likewise, the atmosphere employed will at least be less than 75% of that utilized in the hydration step and, more desirably, will be less than 50% of that used in the hydration step. Here, again, higher temperatures expedite dehydration and 300° C. was deemed to be particularly useful. And, again, the dehydration process will be continued for a sufficient length of time to remove at least 50% and, preferably, in excess of 75% of the water present in the saturated glass. Commonly, this step will utilize exposure times similar to those of the initial dehydration step, supra.

Foamed articles assuming the shape of the container and greater than 0.5 inch in thickness were prepared which evidenced no cracking and exhibited densities less than 0.5 g/cc. It was learned that sunken upper foam surfaces, typical in the conventional preparation of glass foams, could be inhibited in the instant process by hydrating the foamed particulate material and foaming the integrally bonded foamed particles in a container which had a light-weight, unrestrained flat glass or TEFLON® pad covering almost the entire foam surface. Also, the resultant product exhibited more uniformly sized pores and a more homogeneous density throughout the various portions thereof.

The capability of fabricating foamed glass bodies of low density, good chemical durability, and low thermal conductivity utilizing the method of the instant invention is dependent upon maintaining the initial glass composition reasonably within the ranges cited above. Hence, freedom from extraneous constituents, other than surface tension reducing agents, is much to be preferred and the sum of all additional components ought not to exceed about 5 mole percent.

I claim:

1. A method for making an alkali metal silicate glass foam which comprises the steps of:

Step (a) subjecting anhydrous glass consisting essentially, in mole percent on the oxide basis, of about 8-23% $Na_2O$ and/or $K_2O$, 1.5-11.5% $Al_2O_3$ and/or $B_2O_3$ and/or $Fe_2O_3$ and/or ZnO, and 65-90% $SiO_2$, to a $H_2O$-containing gaseous environment having a relative humidity of at least about 75% at a temperature in excess of 100° C., but less than the softening point of the anhydrous glass, for a sufficient length of time to hydrate said glass wherein the amount of water therein will be in excess of 10% by weight;

Step (b) exposing fine-dimensioned bodies of said hydrated glass to a temperature in excess of 100° C., but below that of the softening point of the anhydrous glass, and a relative humidity less than 75% of that employed in the hydration process of Step (a) for a sufficient length of time to reduce the water content therein at least 50% and yield individual foam bodies;

Step (c) subjecting said foamed bodies to a $H_2O$-containing environment having a relative humidity of at least about 50% at a temperature at or below about 250° C., but above about 100° C., for a sufficient length of time to hydrate said glass to a water content in excess of 10% by weight and tightly bond said bodies into an integral mass;

Step (d) exposing said integral mass to a temperature in excess of 100° C., but below that of the softening point of the anhydrous glass, and a relative humidity less than 75% of that employed in the hydration process of Step (c) for a sufficient length of time to reduce the water content therein at least 50% and foam said mass.

2. A method according to claim 1 wherein said anhydrous glass is hydrated through subjection to a $H_2O$-containing gaseous environment saturated with steam at a temperature in excess of 200° C., but less than the softening point of the anhydrous glass.

3. A method according to claim 1 wherein said anhydrous glass is hydrated for a period of time ranging between about 0.25-72 hours.

4. A method according to claim 1 wherein said fine-dimensioned bodies of hydrated glass are dehydrated and foamed through exposure to a temperature of at least 200° C., but less than the softening point of the glass, and a relative humidity less than 50% of that employed in the hydration process of Step (a).

5. A method according to claim 1 wherein said fine-dimensioned bodies of hydrated glass are dehydrated and foamed for a period of time ranging between about 1 minute to 4 hours.

6. A method according to claim 1 wherein said individual foam bodies are subjected to a $H_2O$-containing gaseous environment saturated with steam at a temperature between about 120°–200° C.

7. A method according to claim 1 wherein said individual foam bodies are hydrated for a period of time ranging between about 0.25–24 hours.

8. A method according to claim 1 wherein said integral mass is dehydrated and foamed through exposure to a temperature of at least 200° C., but less than the softening point of the glass, and a relative humidity less than 50% of that employed in the hydration process of Step (c).

9. A method according to claim 1 wherein said integral mass is dehydrated and foamed for a period of time ranging about 1 minute to 4 hours.

10. A method according to claim 1 wherein said anhydrous glass also contains up to about 1 mole percent of $CdO$ and/or $MoO_3$ and/or $TiO_2$ and/or $WO_3$.

* * * * *

UNITED STATES PATENT AND TRADEMARK OFFICE
CERTIFICATE OF CORRECTION

PATENT NO. : 4,080,187
DATED : March 21, 1978
INVENTOR(S) : Donald R. Parnell

It is certified that error appears in the above-identified patent and that said Letters Patent are hereby corrected as shown below:

Column 8, Claim 1, line 27, delete "wherein the" and insert -- to cause the penetration of water therein to an --.

line 28, delete "of water therein will be".

line 35, after "time" insert -- to release water from said hydrated glass bodies --.

line 36, after "and" insert -- thereby --.

line 37, after "(c)", insert -- placing said foamed bodies together and --.

line 38, after "taining" insert -- gaseous --.

line 42, after "glass" insert -- to cause the penetration of water therein --.

line 43, after "and" insert -- to cause said bodies to --.

line 43, delete "said bodies into an integral mass" and insert -- together into an integral mass but not to cause the foamed bodies to collapse; and --.

UNITED STATES PATENT AND TRADEMARK OFFICE
CERTIFICATE OF CORRECTION

PATENT NO. : 4,080,187

DATED : March 21, 1978

INVENTOR(S) : Donald R. Parnell

It is certified that error appears in the above-identified patent and that said Letters Patent are hereby corrected as shown below:

Column 8, Claim 1, line 51, before "reduce" insert -- release water from said integral mass to --.

line 52, before "foam" insert -- thereby yield a --.

line 52, delete "said".

Signed and Sealed this

Twenty-second Day of August 1978

[SEAL]

Attest:

RUTH C. MASON
Attesting Officer

DONALD W. BANNER
Commissioner of Patents and Trademarks